United States Patent [19]

Sato et al.

[11] Patent Number: 4,556,227
[45] Date of Patent: Dec. 3, 1985

[54] UNIVERSAL PIPE JOINT ASSEMBLY

[75] Inventors: Toshiyuki Sato; Tadayuki Kaida, both of Daito, Japan

[73] Assignee: Kabushiki Kaisha Suiken, Osaka, Japan

[21] Appl. No.: 656,468

[22] Filed: Oct. 1, 1984

[51] Int. Cl.⁴ .............................................. F16J 15/10
[52] U.S. Cl. ............................. 277/207 A; 277/188 A
[58] Field of Search ........... 277/188 R, 188 A, 207 R, 277/207 A, 177

[56] References Cited

U.S. PATENT DOCUMENTS

| | | | |
|---|---|---|---|
| 2,749,193 | 6/1956 | Traub | 277/188 A |
| 2,809,080 | 10/1957 | Mittell et al. | 277/188 A |
| 2,862,736 | 12/1958 | Russell | 277/188 A |
| 3,502,356 | 3/1970 | Schmunk | 277/207 A |
| 3,741,570 | 6/1973 | Garrett | 277/207 A |
| 4,291,890 | 9/1981 | Walker | 277/177 |

FOREIGN PATENT DOCUMENTS 55-18768  9/1980  Japan.

Primary Examiner—Robert I. Smith
Attorney, Agent, or Firm—Birch, Stewart, Kolasch & Birch

[57] ABSTRACT

A universal pipe joint assembly which comprises a connector housing having a main cavity defined by an internal spherical concave wall of a connector housing body a pair of axially spaced split rings with their inclined external circumferential walls disposed in relatively slidable contact with the internal spherical concave wall, each of the split rings being deformable so as to be inserted into the main cavity and expansible within the main cavity to take its operating position and a spacer seal ring sandwiched between the pair of split rings.

6 Claims, 11 Drawing Figures

UNIVERSAL PIPE JOINT ASSEMBLY

BACKGROUND AND SUMMARY OF THE INVENTION

This invention relates to a universal pipe joint assembly, and more particularly to improvements in the assembly of the type that is particularly advantageous when utilized for connecting pipes as fluid conduits whose internal diameter is in the range of 20 mm to 100 mm.

A typical example among various conventional models of the universal pipe joint is disclosed in FIG. 1 of Japanese Utility Model Application No. 55-187689 (Laid-open No. 57-112191), and also illustrated herein in FIG. 11 of the accompanying drawings for convenience of specifying its particular construction featured by a connector housing CH having a spherical concave wall $SP_1$ formed internally thereof and a ball member BM having a spherical convex wall $SP_2$ disposed in relatively slidable contact with the aforesaid spherical concave wall $SP_1$, so that an inserted pipe P is angularly movable in all directions with relative to the connector housing CH.

With such particular prior art construction, it is inevitably necessary to divide the connector housing CH into two pieces, that is, a connector body CB and a cap nut CN, in order that the ball member BM can be assembled with the connector housing CH. However, such two piece construction of the connector housing CH is disadvantageous from the viewpoint of possible leakage of fluid at threads TH and increase in manufacturing cost. Further, the slidable contact area between the spherical walls $SP_1$, $SP_2$ is relatively large and therefore extreme precision in surface finishing of such spherical walls $SP_1$, $SP_2$ is required in order to permit a smoothly slidable relationship between the walls $SP_1$, $SP_2$, which requires skill and also invites an increase in the manufacturing cost. Still further, at least two seal rings $SR_1$, $SR_2$ together with fitting grooves therefor are inevitably required, which also invites an increase in the manufacturing cost and process.

It is, therefore, an object of the invention to substantially reduce the above discussed disadvantages in the prior art universal pipe joint construction.

Another object of the invention is to provide an improved universal pipe joint assembly which permits manufacture at a lower cost as comprared with the prior art assembly.

A further object of the invention is to provide an improved universal pipe joint assembly which permits a telescopic and flexible relationship between the assembly and an associated pipe, while maintaining a good sealing effect.

Still a further object of the invention is to provide an improved universal pipe joint assembly which permits a sufficient sealing effect by use of only one seal ring.

Yet a further object of the invention is to provide an improved universal pipe joint assembly which permits one-piece construction of a connector housing.

Other objects, features and advantages of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become obvious to those skilled in the art from this detailed description.

According to the invention, there is provided a universal pipe joint assembly which comprises a connector housing having a main cavity formed in its body so as to be interposed between an opening mouth and a subcavity in communication therewith, the main cavity being defined by an internal spherical concave wall of the connector housing body a pair of axially spaced split rings symmetrically arranged within the main cavity, with their inclined external circumferential walls disposed in relatively slidable contact with the internal spherical concave wall of the main cavity, each of the inclined external circumferential walls being preferably in the form of a part of a spherical convex wall, each of the split rings being deformable for reduction of its diametrical dimension so as to pass through the opening mouth into the main cavity and expansible within the main cavity to take its operating position and a seal ring sandwiched between the pair of split rings, the seal ring serving as a spacer for the pair of split rings.

BRIEF DESCRIPTION OF THE DRAWINGS

In the accompanying drawings

DESCRIPTION OF THE PREFERRED EMBODIMENTS

Referring now to the accompanying drawings, a universal pipe joint assembly JA of the invention is illustrated as having a connector housing 10 which has an internal hollow space formed in its body for receiving an end portion of a pipe P on which the pipe joint assembly JA is fitted.

Figure 2:
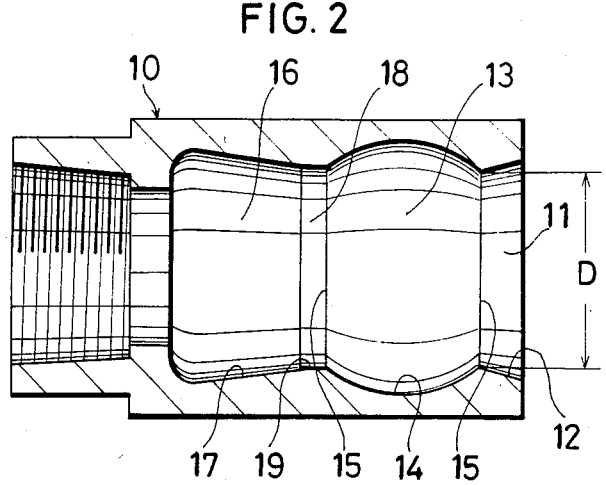
FIG. 2 is a longitudinal section of a connector housing.

More particularly, the internal hollow space may include an opening mouth 11, a main cavity 13 and a sub-cavity 16, all being axially aligned in communication with each other, as best shown in FIG. 2. The opening mouth 11 is defined by a first internal wall 12 which may preferably be a conical wall diametrically increased toward the outside (from left to right in FIG. 2). The main cavity 13 may be formed adjacent to the opening mouth 11 and is defined by a second internal wall 14 which is a spherical concave wall, so that the main cavity is diametrically reduced toward its opposite ends 15 where the minimum diameter D is given as indicated in FIG. 2. The sub-cavity 16 may be formed adjacent to the main cavity 13 and defined by a third internal wall 17 which may be a conical wall diametrically increased toward the outside (from right to left in FIG. 2).

Figure 7:
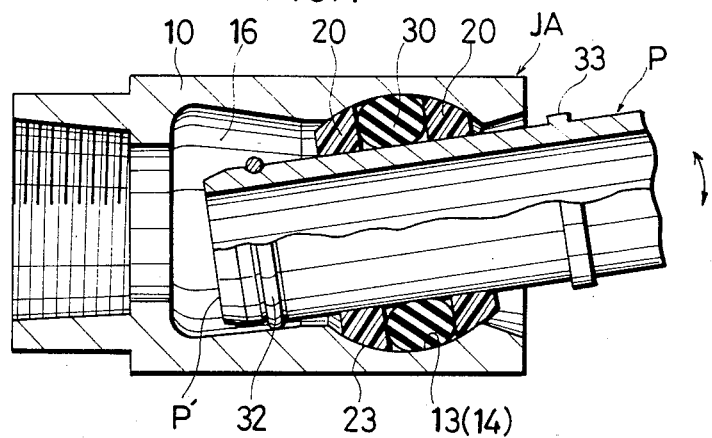
FIG. 7 is a similar view to FIG. 6, but showing the flexible relationship between the pipe joint assembly and the associated pipe.
Figure 10:
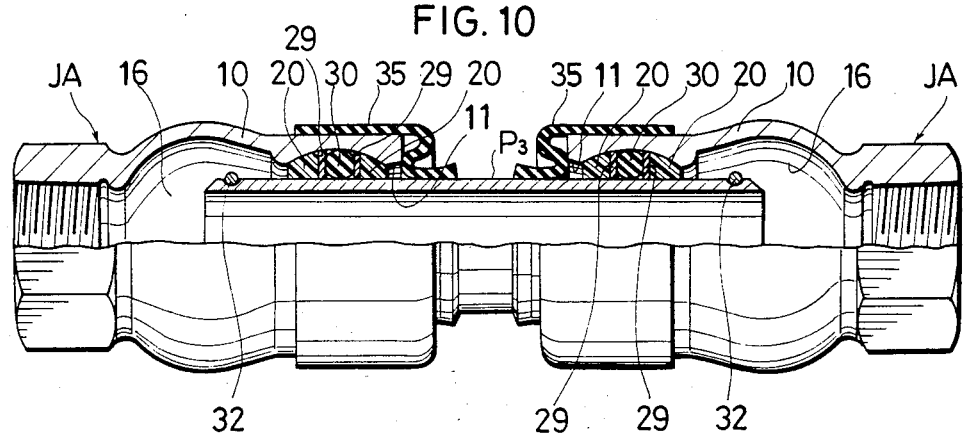
Figure 11:
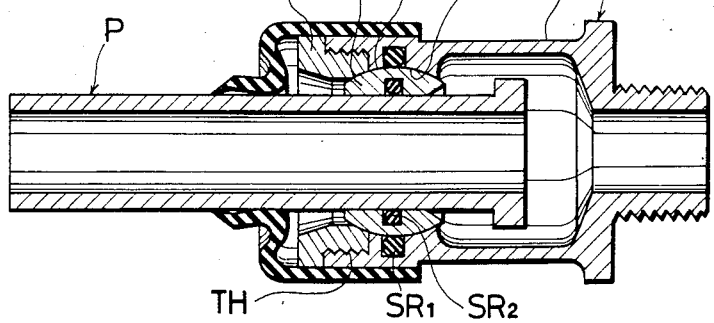
FIG. 11 is a longitudinal section showing an example of the prior art universal type pipe joint construction.

Configurations of the opening mouth 11 and the sub-cavity 16 should not be limited to the illustrated example but may be varied, conditioned that a desired flexibile pipe connection can be attained. For example, the first and the third internal walls 12, and 17 may be cylindrical so as to provide a cylindrical opening mouth (not shown) and also a cylindrical sub-cavity (not shown but obvious from FIG. 11). In this case, however, the diameter of the cylindrical opening mouth and also that of the cylindrical sub-cavity should be large enough to permit a flexible pipe connection (relatively angularly movable fitting of the pipe joint assembly JA over the pipe P) as shown in FIG. 7. Another example of such configuration of the sub-cavity 17 is illustrated in FIG. 10, in which the sub cavity is partially spherical.

Further, if desired, a narrow transit cavity 18 defined by a narrow cylindrical internal wall 19 may be interposed between the main cavity 13 and the sub-cavity 17, as illustrated in FIG. 2. A similar transit cavity (not shown) may also be interposed between the opening mouth 11 and the main cavity 13.

Within the main cavity 13 are symmetrically disposed a pair of axially spaced split rings 20 each having a substantially annular small end wall 21 split at 24, a substantially annular large end wall 22 split at 24 and an inclined, external circumferential wall 23 which may preferably be in the form of a part of a convex wall whose spherical radius is substantially equal to that of the spherical concave wall 14 of the main cavity 13, so that the smoothly slidably contact relationship can be provided between the walls 14, 23. However, in a particular case where the spherical radius of the wall 14 is considerably large, the wall 23 may be substituted by a tapered wall (not shown) for easy manufacture. Each of the split rings 20 is positioned in the main cavity 13, with its small end wall 21 directed to the respective end 15 of the main cavity 13.

Each of the split rings 20 may be formed of a suitable synthetic resin substantially rigid but elastically deformable in nature, such as, for example, "DULACON" (Trademark) manufactured by Celanese Corp., U.S.A. If desired, it is also possible to form the split ring 20 of a metallic material such as stainless steel, unless the ring 20 is too rigid, that is, too thick in its wall thickness, to prevent the ring 20 from being elastically deformed as illustrated in FIG. 5.

Figure 3:
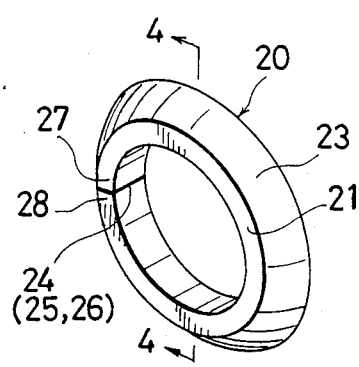
FIG. 3 is a perspective view of a split ring in its operating posture.
Figure 4:
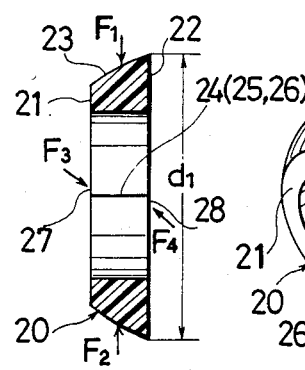
FIG. 4 is a cross section taken along the lines 4—4 of FIG. 3.

Each of the elastically deformable ring 20 is split at 24 in FIGS. 3 and 4 to form a pair of opposed cross cut end walls 25, 26 (FIG. 5) which are slightly spaced apart from each other to provide a certain gap (not shown) therebetween when the ring 20 is free from any external compressive force. On the other hand, when external compressive forces $F_1$, $F_2$ (FIG. 4) are diametrically applied to the ring 20, it is reduced in diameter against its elastic expansibility until the opposed end walls 25, 26 come into tight contact with each other as illustrated in FIGS. 1, 3, and 4.

Figure 1:
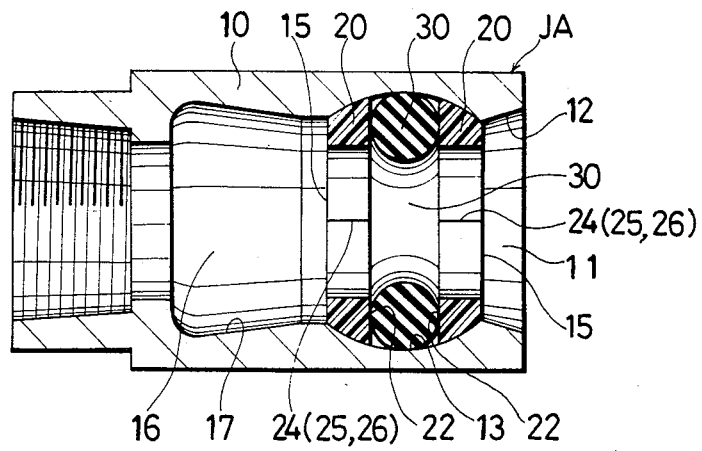
FIG. 1 is a longitudinal section of one embodiment of a pipe joint assembly according to the invention.

Thus, when the split ring 20 is in its operating position as shown in FIG. 1, its external circumferential wall 23 is pressed against the spherical concave wall 14 of the main cavity 13 by the expansibility of the split ring 20, resulting in that the ring 20 is retained in position within the main cavity 13, with frictional engagement therewith.

Figure 5:
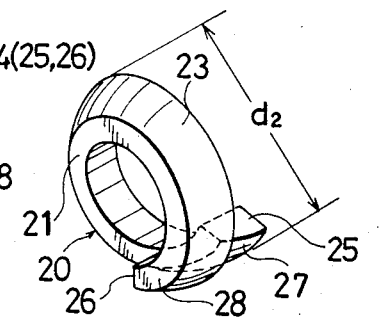
FIG. 5 is a perspective view of the split ring in its deformed posture.

When external forces $F_3$, $F_4$ (FIG. 4) are applied from opposite directions to the end portions 27, 28 of the split ring 20, it can be deformed so that the end portions 27, 28 are overlapped with each other as illustrated in FIG. 5. Consequently, the maximum external diameter of the split ring 20 can be reduced from $d_1$ (FIG. 4) to $d_2$ (FIG. 5), wherein $d_1$ is larger than D (FIG. 2) while $d_2$ is smaller than D. Thus, in assembly, the split rings 20 can be inserted through the opening mouth 11 into the main cavity 13. Upon release from the applied external forces $F_3$, $F_4$ after the insertion into the main cavity, each of the split rings expands to take its operating position as illustrated in FIG. 1. Since the split rings 20 can be easily assembled with the connector housing 10 in this way, it is no longer necessary to prepare the conventional two-piece construction of the connector housing.

Figure 6:
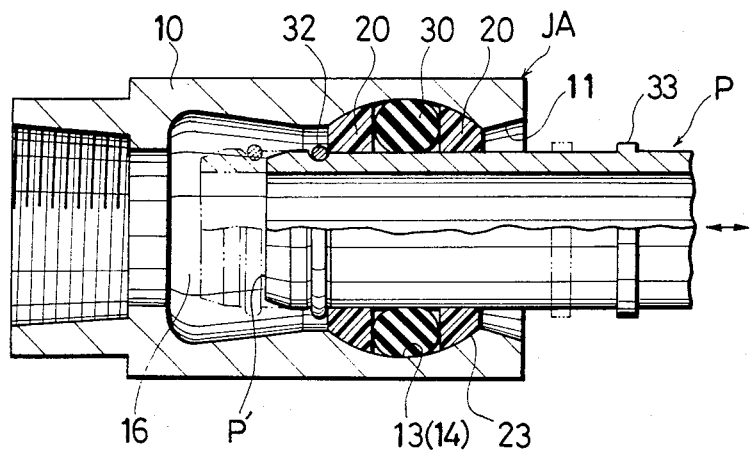
FIG. 6 is a longitudinal section showing the telescopic relationship between the pipe joint assembly and an associated pipe.

Also within the main cavity 13 is diposed a deformable spacer seal ring 30 such as an O-ring seal, which is sandwiched between a pair of the opposed large end walls 22, as illustrated in FIG. 1. When the pipe joint assembly JA is fitted onto the pipe P, the spacer seal ring 30 is forcibly deformed by a external circumferential wall of the end portion of the inserted pipe P thereby to provide a known liquid-tight relationship between the connector housing body 10 and the inserted pipe P as illustrated in FIGS. 6, 7. It will be easily understood that the deformable ring 30 serves not only as a conventional seal ring but also as a spacer for maintaining a certain distance between the opposed split rings 20. A cross sectional area and configuration of an annular body of the seal ring 30 may be predetermined as desired.

If desired, a deformable annular plate 29 (FIG. 10), preferably formed of the aforesaid "DULACON", may be interposed between each split ring 20 and the spacer seal ring 30. The annular plate 29 may be a gasket for enhancing the sealing effect against leakage of liquid from a slight gap between the opposed cut end walls 25, 26 at the split portion 24 of the ring 20, or otherwise it may be a spacer for clearance adjustment.

The end portion of the pipe P may preferably be provided with a pair of spaced stoppers for preventing an excessive axial movement of the pipe P. In the illustrated embodiments, one of such stoppers is in the form of a known stop ring 32 snapped into an annular groove formed in the external circumferential wall of the pipe end, and another of the stoppers is in the form of an annular flange 33 formed integral with the pipe P.

In assembly, a first split ring 20 is deformed by external compressive forces diametrically applied thereto as illustrated in FIG. 5 and inserted, in its deformed posture and with its small end wall 21 directed forwardly, through the opening mouth 11 into the main cavity 13. The inserted split ring 20 is released from the applied external forces in the main cavity 13 thereby to expand itself by its elastic nature to take its operating posture. Then, the inserted split ring 20 is properly positioned so that its small end wall 21 is disposed adjacent to the inner end wall 15 of the main cavity 13. Then, the spacer seal ring 30 is inserted through the opening mouth 11 into the main cavity 13, so that the inserted spacer seal ring 30 is disposed in contact with the large end wall 22 of the first inserted split ring 20. Finally, a second split ring 20 is inserted into the main cavity 13 in the same manner as described but with its large end wall 22 directed forwardly, so that the large end wall 22 is disposed in contact with the inserted spacer seal ring 30. In this way, the first and the second split rings 20 and the spacer seal ring 30 can be quite easily assembly with the connector housing 10 of one-piece construction.

In operation, the pipe joint assembly JA is fitted onto an associated pipe P by insertion, so that a terminal end P' (FIGS. 6, 7) of the pipe P is disposed within the sub-cavity 16. Thus, the spacer seal ring 30 is forcibly deformed under presssure by an external circumferential wall of the inserted pipe end portion P and confined in an annular space defined by a part of the spherical concave wall 14, the opposed large annular end walls 22 and the circumferential wall of the inserted pipe end portion. An expected sealing effect can be easily obtained by selecting a proper dimension of the spacer seal ring to be employed.

The inserted Pipe P is axially movable in either directions with relative to the pipe joint assembly JA within a limited range, with maintaining an expected sealing effect, resulting in that not only lengthwise adjustment in in pipe lines can be easily carried out but also a possible damage to the pipe joint assembly JA can be prevented which may occur when an extraordinary high fluid pressure is axially applied to the inserted pipe P, for instance.

Further, because the circumferential walls 23 of the split rings 20 are in relatively slidable contact with the internal spherical concave wall 14 of the connector housing 10, the inserted pipe P is angularly movable in all directions relative to the pipe joint assembly JA, without losing an expected sealing effect. Thus, the pipe joint assembly JA of the invention can serve as a universal pipe joint.

Figure 8:
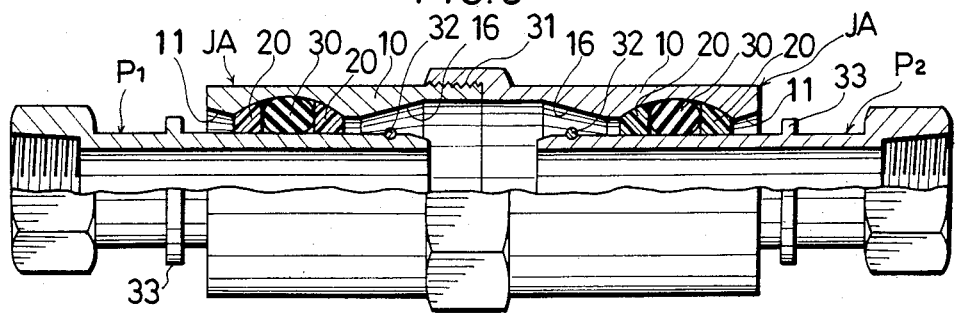
FIGS. 8 to 10 are longitudinal sections showing examples of application of the invention to universal pipe connection.

FIG. 8 illustrates an example of a universal pipe joint construction in which the pipe joint assembly JA of the invention is employed in pairs in order to connect a pair of opposed pipes P₁ and P₂. The pair of pipe joint assemblies JA are integrally connected by threads 31. Each of the pipes P₁, P₂ is axially movable relative to the pipe joint assemblies JA within a certain limited range defined by a distance between the stop ring 32 and the stopper flange 33, while maintaining the expected liquid-tightness. Further, each of the pipes P₁, P₂ is angularly movable in all directions relative to the pipe joint assemblies JA, while maintaining the expected liquid-tightness, in the manner substantially the same as illustrated in FIG. 7.

Figure 9:
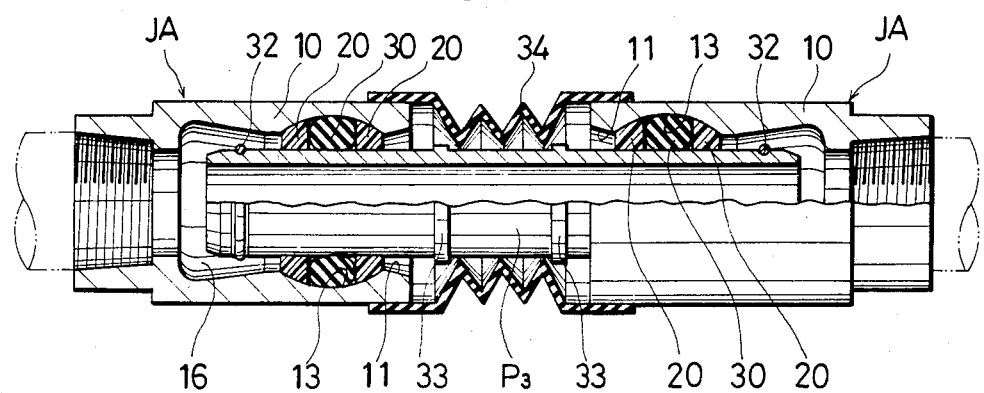

FIG. 9 illustrates another example of application of the invention to universal pipe connection, wherein a pair of spaced pipe joint assemblies JA are fitted on a joint pipe P₃. Each of the pipe joint assemblies JA is movable not only axially but also angularly relative to the pipe P₃. Reference numeral 34 designates a known elastic bellow fitted over the opposed ends of the connector housings 10 for the known sealing purpose.

FIG. 10 illustrates a further example of application of the invention to a universal pipe connection, wherein annular gaskets 29 are incorporated so as to cover the large end walls 22 of the split rings, and a sealing cover 35 is capped onto each of the opposed ends of the connector housings 10. The joint pipe P₃ is formed with no stopper flanges 33 because the opposed sealing covers 35 will substantially take the part of such flanges 33. The sub-cavities 16 may be formed by known bulging process.

The present invention being thus described, it will be obvious that the same may be varied in many ways. Such variations are not to be regarded as a departure from the spirit and scope of the invention, and all such modifications as would be obvious to one skilled in the art are intended to be included within the following claims.

We claim:

1. A universal pipe joint assembly comprising
   a connector housing having an internal axial space formed in a body of said connector housing,
   said internal axial space including a main cavity interposed between an opening mouth and a sub-cavity in communication therewith,
   said main cavity being defined by an internal spherical concave wall of said body of said connector housing,
   a pair of split rings which are axially spaced and symmetrically arranged within said main cavity, with their inclined external circumferential walls disposed in relatively slidable contact with said internal spherical concave wall of said body of said connector housing,
   each of said pair of split rings being deformable for reduction of its diametrical dimension so as to be inserted through said opening into said main cavity and expansible within said main cavity to take its operating position, and
   a spacer seal ring sandwiched between said pair of split rings.

2. The pipe joint assembly as defined in claim 1, wherein
   each of said inclined external circumferential walls of said pair of split rings is in the form of a part of a spherical convex wall.

3. The pipe joint assembly as defined in claim 1, wherein
   each of said split rings is formed with a substantially annular small end wall and substantially annular large end wall.

4. The pipe joint assembly as defined in claim 1, wherein
   each of said split rings is formed with a pair of opposed cross cut end walls which are in abutment with each other when said each of said split rings is in its operating positions within said main cavity.

5. The pipe joint assembly as defined in claim 1, wherein
   a transit cavity is formed between said main cavity and said sub-cavity.

6. The pipe joint assembly as defined in claim 1, wherein
   at least one annular plate is interposed between said seal ring and at least one of said pair of split rings.

* * * * *